United States Patent
Gray et al.

(10) Patent No.: US 10,886,064 B2
(45) Date of Patent: Jan. 5, 2021

(54) CAPACITOR CUP AND ARRANGEMENT FOR FASTENING CAPACITOR CUP

(71) Applicant: Danfoss Power Electronics A/S, Graasten (DK)

(72) Inventors: Matthew Donovan Gray, Rockford, IL (US); George Miller, Roscoe, IL (US); Shawn Rink, South Beloit, IL (US); Michael Lai, Rockford, IL (US); Stephen Ray Larsen, Cary, NC (US)

(73) Assignee: DANFOSS POWER ELECTRONICS A/S, Gråsten (DK)

( * ) Notice: Subject to any disclaimer, the term of this patent is extended or adjusted under 35 U.S.C. 154(b) by 61 days.

(21) Appl. No.: 16/092,909

(22) PCT Filed: Apr. 12, 2017

(86) PCT No.: PCT/EP2017/058729
§ 371 (c)(1),
(2) Date: Oct. 11, 2018

(87) PCT Pub. No.: WO2017/178507
PCT Pub. Date: Oct. 19, 2017

(65) Prior Publication Data
US 2019/0206621 A1    Jul. 4, 2019

Related U.S. Application Data

(60) Provisional application No. 62/322,902, filed on Apr. 15, 2016.

(51) Int. Cl.
*H01G 2/04* (2006.01)
*H01G 2/10* (2006.01)
*H05K 5/02* (2006.01)

(52) U.S. Cl.
CPC .............. *H01G 2/04* (2013.01); *H01G 2/103* (2013.01); *H05K 5/02* (2013.01)

(58) Field of Classification Search
CPC ............. H01G 2/04; H01G 2/103; H05K 5/02
See application file for complete search history.

(56) References Cited

U.S. PATENT DOCUMENTS 3,511,982 A * 5/1970 Salter ..................... H01R 33/09
  362/382
6,244,544 B1   6/2001 Kitscha et al.
(Continued)

FOREIGN PATENT DOCUMENTS

EP        1132930 A1    9/2001
JP     2000173861 A    6/2000

OTHER PUBLICATIONS

International Search Report for Serial No. PCT/EP2017/058729 dated Jul. 7, 2017.

*Primary Examiner* — Michael P McFadden
(74) *Attorney, Agent, or Firm* — McCormick, Paulding & Huber PLLC

(57) ABSTRACT

The present invention relates to an arrangement for fastening a capacitor cup within which a capacitor is accommodated. The arrangement is for fastening a capacitor cup onto an opening of a mid-plate, wherein the capacitor cup comprises a cylindrical body having an opening end and an opposite end. The arrangement comprises: a collar provided on an outer surface of the cylindrical body, closely around the opening end; at least one first engagement feature formed at the outer surface of the cylindrical body and adjacent to the collar; and, at least one second engagement feature, corresponding to the first engagement feature, formed at an edge of the opening of the mid-plate; wherein, an engagement between the first and second engagement features fastens the capacitor cup onto the opening of the mid-plate. This (Continued)

arrangement for fastening the capacitor cup according to the present invention eliminates additional fastening members or parts, and effectively creates and maintains an environmental seal between the electronics area and the environment.

19 Claims, 8 Drawing Sheets

(56) References Cited

U.S. PATENT DOCUMENTS

| | | | |
|---|---|---|---|
| 2001/0021094 A1* | 9/2001 | Miettinen | H01G 2/04 361/272 |
| 2011/0222261 A1* | 9/2011 | Zengerle | H01M 2/105 361/830 |

* cited by examiner

CAPACITOR CUP AND ARRANGEMENT FOR FASTENING CAPACITOR CUP

CROSS-REFERENCE TO RELATED APPLICATION

This application is a National Stage application of International Patent Application No. PCT/EP2017/058729, filed on Apr. 12, 2017, which claims priority to United States Application No. 62/322,902, filed on Apr. 15, 2016, each of which is hereby incorporated by reference in its entirety.

TECHNICAL FIELD

The present invention relates to a capacitor cup and an arrangement for fastening a capacitor cup.

BACKGROUND

A capacitor cup is used to attach the capacitors to an electrical or electronic device, especially, a mid-plate of the device, and is for protecting the capacitors from stress caused by the environment and creating an environmental seal between the electronics area and the environment.

In prior art, different fasteners, such as clips, bolts and screws, etc., are adopted for fastening the capacitor cup where the capacitors are accommodated to the mid-plate of the electrical or electronic device. However, such prior art solutions are troublesome since additional fastening members or parts are required.

SUMMARY

The present invention has been made to overcome or alleviate at least one aspect of the above mentioned disadvantages existing in the conventional technical solutions.

Accordingly, it is an object of the present invention to provide an arrangement for fastening a capacitor cup, which eliminates additional fastening members or parts.

Accordingly, it is an object of the present invention to provide a capacitor cup, which eliminates additional fastening members or parts.

According to an aspect of the present invention, there is provided an arrangement for fastening a capacitor cup within which a capacitor is accommodated, for fastening the capacitor cup onto an opening of a mid-plate, wherein the capacitor cup comprises a cylindrical body having an opening end and an opposite end. The arrangement comprises: a collar provided on an outer surface of the cylindrical body, closely around the opening end; at least one first engagement feature formed at the outer surface of the cylindrical body and adjacent to the collar; and, at least one second engagement feature, corresponding to the first engagement feature, formed at an edge of the opening of the mid-plate; wherein, an engagement between the first and second engagement features fastens the capacitor cup onto the opening of the mid-plate and creates an environmental seal.

Preferably, the first engagement feature may comprise a projection protruded from the outer surface of the cylindrical body, and the second engagement feature may comprise a slot recessed at the edge of the opening of the mid-plate, wherein, the capacitor cup is fastened onto the opening of the mid-plate when the projection passes through the slot and gets into an engagement with the edge of the opening of the mid-plate.

In one exemplary embodiment, the projection has a wedge-shaped surface facing the collar, and a stop extended from an end of the wedge-shaped surface.

Preferably, the first engagement feature may further comprise a boss protruded from the outer surface of the cylindrical body, and the second engagement feature comprises a recess recessed at an edge of the opening of the mid-plate, wherein, the capacitor cup is fastened onto the opening of the mid-plate when the boss passes through the recess and gets into an engagement with the edge of the opening of the mid-plate.

In one exemplary embodiment, the first engagement feature comprises a plurality of the projections and the boss, and correspondingly, the second engagement feature comprises a plurality of the slots and the recess.

Preferably, the arrangement for fastening the capacitor cup further comprises a seal member provided to seal the engagement between the first and second engagement features.

In a first embodiment, the seal member comprises a gasket attached to a surface of the collar facing towards the opposite end of the capacitor cup.

In a second embodiment, the seal member comprises a gasket molded into a surface of the collar facing towards the opposite end of the capacitor cup.

In a third embodiment, the seal member comprises an O-ring mounted into a groove formed on a surface of the collar facing towards the opposite end of the capacitor cup.

In a fourth embodiment, the seal member comprises a gasket attached to the edge of the opening of the mid-plate.

In one exemplary embodiment, the seal member is elastic, so as to provide an elastic force to maintain the engagement between the first and second engagement features.

In one exemplary embodiment, the engagement between the first and second engagement is achieved when the capacitor cup is rotated relative to the mid-plate.

According to another aspect of the present invention, there is provided a capacitor cup for accommodating a capacitor therein, the capacitor cup comprising:

a cylindrical body having an opening end and an opposite end;

a collar provided on an outer surface of the cylindrical body, closely around the opening end; and at least one first engagement feature formed at the outer surface of the cylindrical body and adjacent to the collar, for implementing an engagement with at least one corresponding second engagement feature formed on a mid-plate to which the capacitor cup is to be fastened.

Preferably, the first engagement feature may comprise a projection protruded from the outer surface of the cylindrical body, for passing through a slot formed on the mid-plate. In one exemplary embodiment, the projection has a wedge-shaped surface facing the collar, and a stop extended from an end of the wedge-shaped surface.

Preferably, the first engagement feature may further comprise a boss protruded from the outer surface of the cylindrical body, for passing through a recess formed on the mid-plate.

Preferably, the capacitor cup may further comprises a seal member provided to create a seal between the capacitor cup and the mid-plate, wherein the seal member is elastic, so as to provide an elastic force to maintain the engagement between the first and second engagement features.

In a first embodiment, the seal member comprises a gasket attached to a surface of the collar facing towards the opposite end of the capacitor cup.

In a second embodiment, the seal member comprises a gasket molded to a surface of the collar facing towards the opposite end of the capacitor cup.

In a third embodiment, the seal member comprises an O-ring mounted into a groove formed on a surface of the collar facing towards the opposite end of the capacitor cup.

In one exemplary embodiment, in the capacitor cup, the opposite end of the cylindrical body is another opening end.

As apparent from the above, the present invention at least has following advantages.

In this arrangement for fastening the capacitor cup according to the present invention, an engagement between the first engagement feature directly formed on the capacitor cup and the second engagement feature directly formed at the mid-plate is used. With the adoption of such engagement, the capacitor cup is fastened onto the opening of the mid-plate, without involving any additional fastening members or parts. Moreover, in this arrangement for fastening the capacitor cup according to the present invention, a seal member is provided to seal the engagement between the first and second engagement features.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 1:
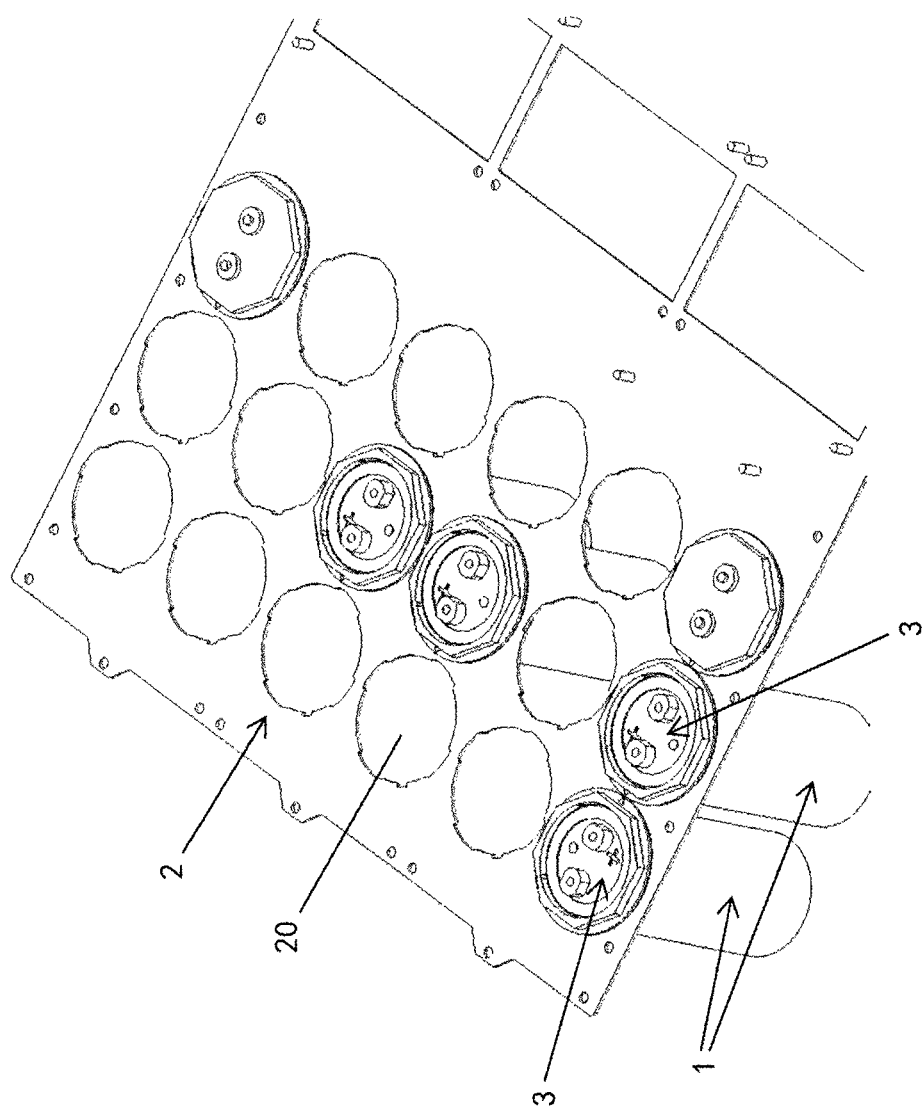
FIG. 1 is a perspective view showing attachment of several capacitor caps to a mid-plate by means of an arrangement for fastening the capacitor cap according to an embodiment of the present invention.

The scope of the present invention will in no way be limited to the simply schematic views of the drawings, the number of constituting components, the materials thereof, the shapes thereof, the relative arrangement thereof, etc., and are disclosed simply as an example of an embodiment.

DETAILED DESCRIPTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
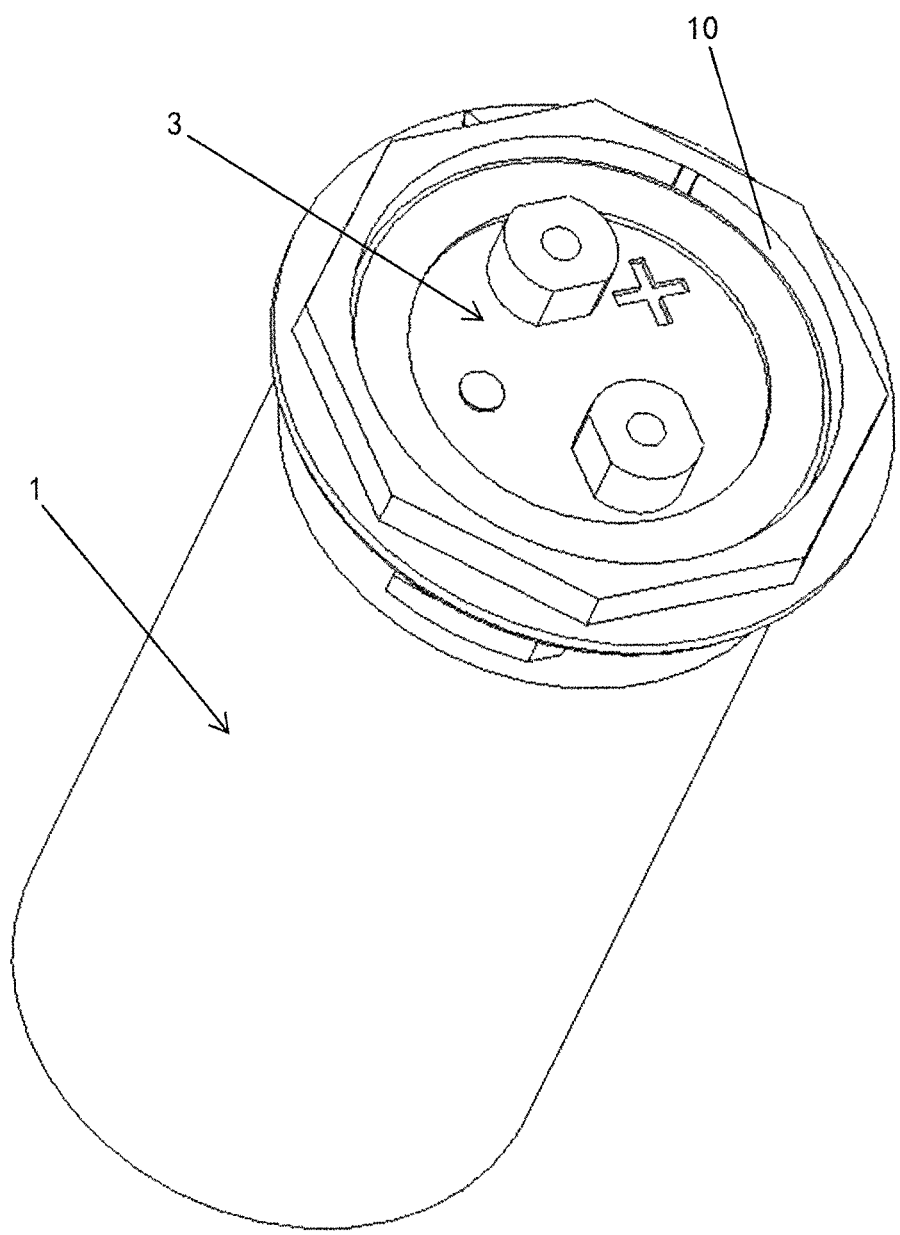
FIG. 2 is a perspective view showing the arrangement for fastening the capacitor cap, where which a capacitor is accommodated, according to an embodiment of the present invention.

Referring to FIGS. 1-5, there provides an arrangement for fastening a capacitor cup 1 according to an embodiment of the present invention. Here, the capacitor cup 1 is used to protect a capacitor 3 from stress caused by the environment and to fasten a capacitor 3 to a place of installation, e.g., a mid-plate 2 of an electrical or electronic device, such as a motor drive, wherein, the capacitor 3 is accommodated within the capacitor cup 1. Specifically, as shown in FIG. 2, the capacitor cup 1 comprises a cylindrical body 10 having an opening end and an opposite closed end, and, the capacitor 3 is accommodated within the capacitor cup 1 through the opening end. For example, the capacitor 3 may be press fit into the capacitor cup 1. The capacitor cup 1 is made of electrically insulating material, for example, polymer.

Figure 3:
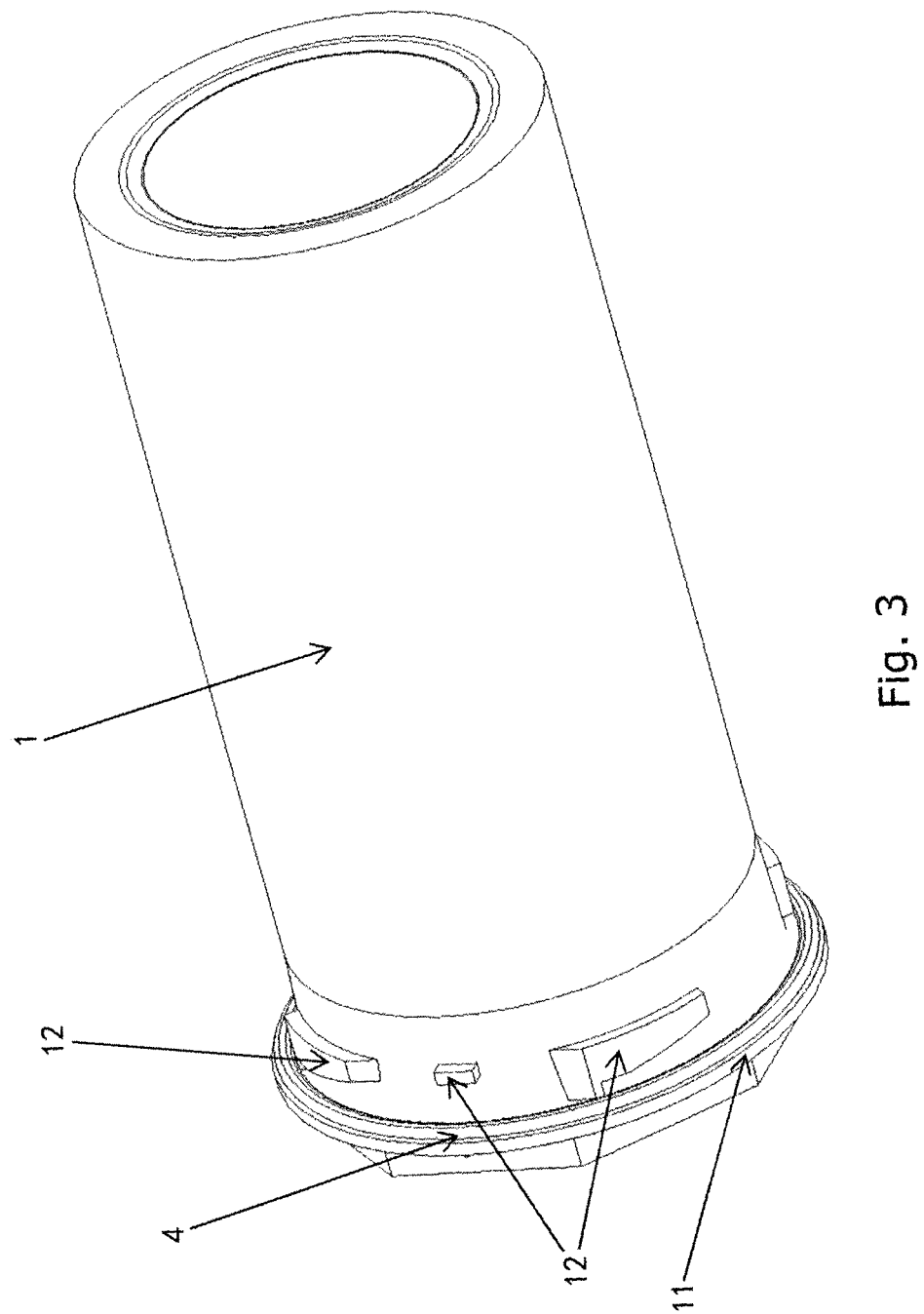
FIG. 3 is another perspective view showing the arrangement for fastening the capacitor cap according to an embodiment of the present invention, in which a first engagement feature and a seal member are presented.
Figure 5:
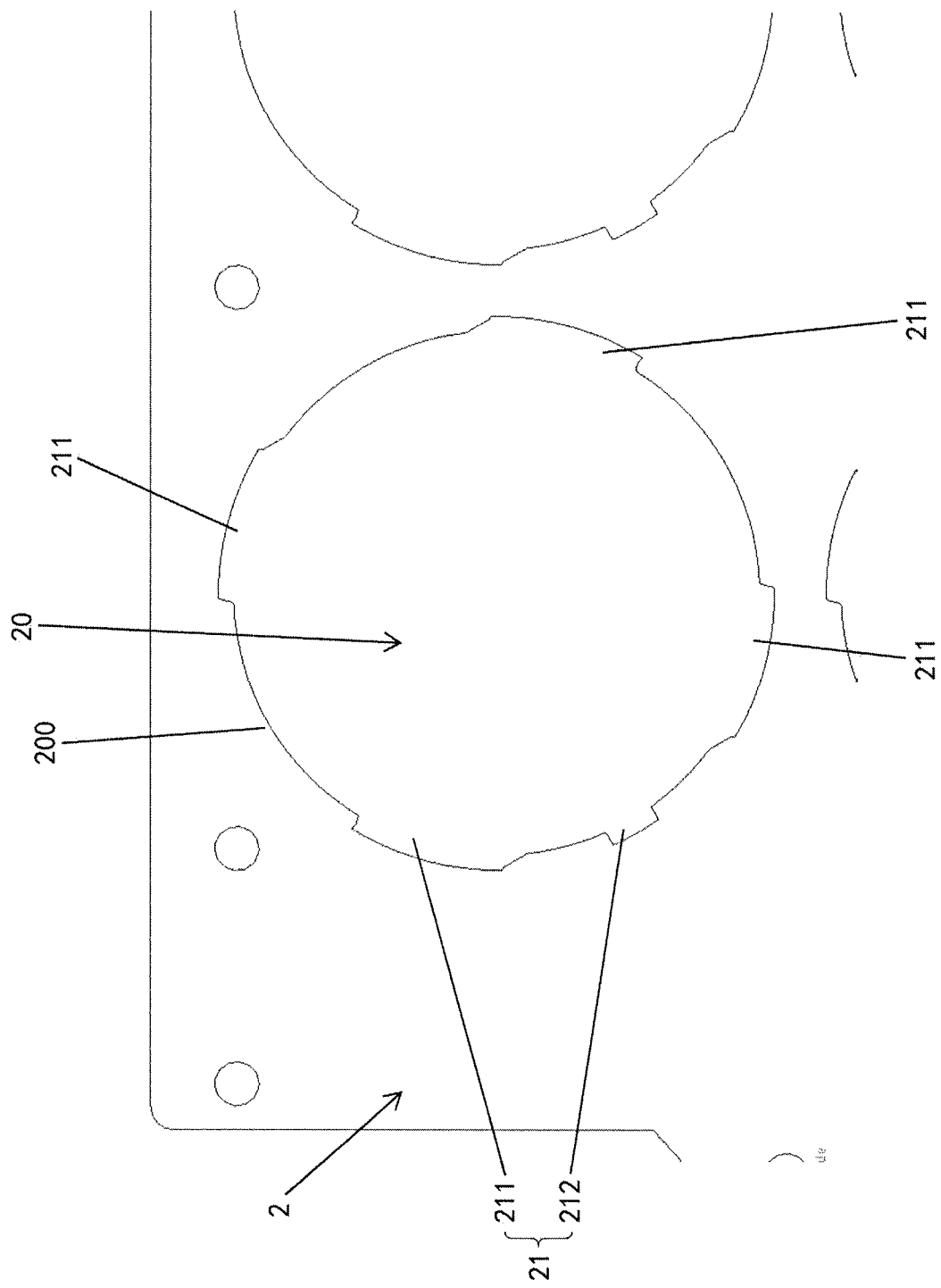
FIG. 5 is a perspective view showing a mid-plate having a second engagement feature according to an embodiment of the present invention.

The arrangement for fastening a capacitor cup 1 according to the present invention is for fastening the capacitor cup 1 onto an opening 20 of the mid-plate 2. As shown in FIGS. 3 and 5, the arrangement comprises: a collar 11 provided on an outer surface of the cylindrical body 10 and closely around the opening end; at least one first engagement feature 12 formed at the outer surface of the cylindrical body 10 and adjacent to the collar 11; and, at least one second engagement feature 21, corresponding to the first engagement feature 12, formed at an edge 200 of the opening 20 of the mid-plate 2; wherein, an engagement between the first and second engagement features 12, 21 fastens the capacitor cup 1 onto the opening 20 of the mid-plate 2. In the arrangement for fastening a capacitor cup 1, the first and second engagement features 12, 21 are directly formed on the capacitor cup 1 and the mid-plate 2, respectively. The capacitor cup 1 is fastened onto the opening 20 of the mid-plate 2 when an engagement between the first and second engagement features 12, 21 is achieved. In this exemplary embodiment, the engagement between the first and second engagement 12, 21 is achieved when the capacitor cup 1 is rotated relative to the opening 20 of the mid-plate 2 after the capacitor cup 1 is inserted into the opening 20 of the mid-plate 2. As a result, no additional fastening members or part is involved.

Figure 4:
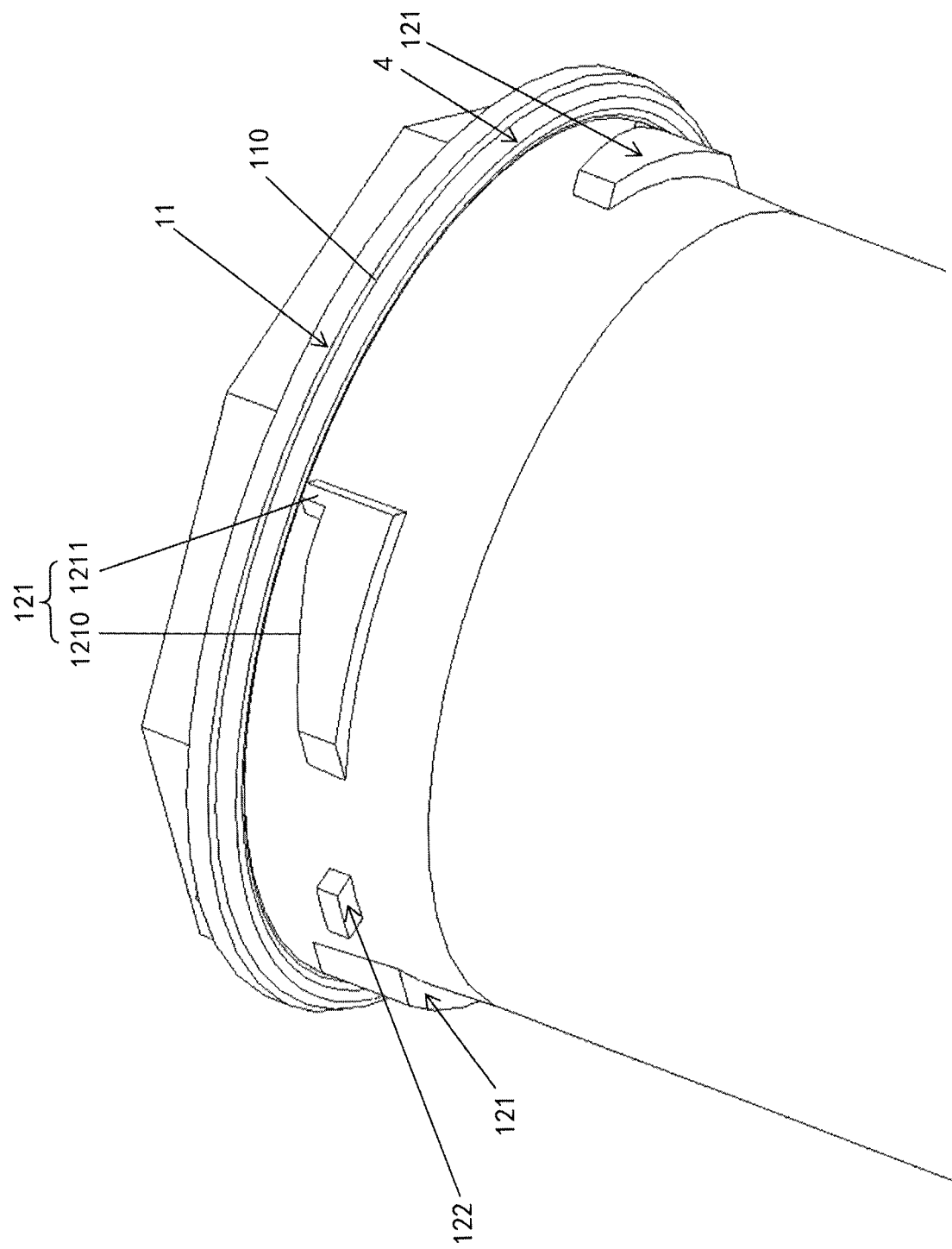
FIG. 4 is partially enlarged view showing the arrangement for fastening the capacitor cap according to an embodiment of the present invention, in which a first engagement feature and a seal member are presented in detail.

In one embodiment, in such arrangement for fastening the capacitor cup 1, as shown in FIGS. 4 and 5, the first engagement feature 12 comprises a projection 121 protruded from the outer surface of the cylindrical body 10, and the second engagement feature 21 comprises a slot 211 recessed at the edge 200 of the opening 20 of the mid-plate 2. The capacitor cup 1 is fastened onto the opening 20 of the mid-plate 2 when the projection 121 passes through the slot 211 and gets into an engagement with the edge 200 of the opening 20 of the mid-plate 2. In the shown embodiment, the phrase "gets into an engagement with" means that the projection 121 passed through the slot 211 is displaced from the slot 211 such that the capacitor cup 1 cannot depart from the opening 20 of the mid-plate 2. In this way, the capacitor cup 1 is fastened onto the opening 20 of the mid-plate 2 when there achieves the engagement between the first and second engagement 12, 21.

In an exemplary embodiment, the projection 121 may have a wedge-shaped surface 1210 facing the collar 11, and a stop 1211 extended from an end of the wedge-shaped surface 1210. The wedge-shaped surface facilitates the rotation of the capacitor cup 1 relative to the opening 20 of the mid-plate 2, and the stop prevents the over-rotation of the capacitor cup 1 relative to the opening 20 of the mid-plate 2.

In addition, the first engagement feature 12 may further comprise a boss 122 protruded from the outer surface of the cylindrical body 10, and, correspondingly, the second engagement feature 21 comprises a recess 212 recessed at an edge 200 of the opening 20 of the mid-plate 2, wherein, the capacitor cup 1 is fastened onto the opening 20 of the mid-plate 2 when the boss 122 passes through the recess 212 and gets into an engagement with the edge 200 of the opening 20 of the mid-plate 2. Also, in the shown embodiment, the phrase "gets into an engagement with" means that the boss 122 passed through the recess 212 is displaced from the recess 212 such that the capacitor cup 1 cannot depart from the opening 20 of the mid-plate 2.

In an exemplary embodiment shown, as shown in FIGS. 3 to 5, the first engagement feature 12 comprises a plurality of the projections 121 and the boss 122, and correspondingly, the second engagement feature 21 comprises a plurality of the slots 211 and the recess 212. This arrangement can make sure that the capacitor cup assembly is correctly oriented when fastened and mounted to the mid-plate. Preferably, the first engagement feature 12 including the plurality of the projections 121 and the boss 122 is formed integrally with the capacitor cup 1, e.g., by polymer. While, the second engagement feature 21 including the plurality of the slots 211 and the recess 212 is formed during a punching process of the openings 20 on the mid-plate 2.

Figure 6:
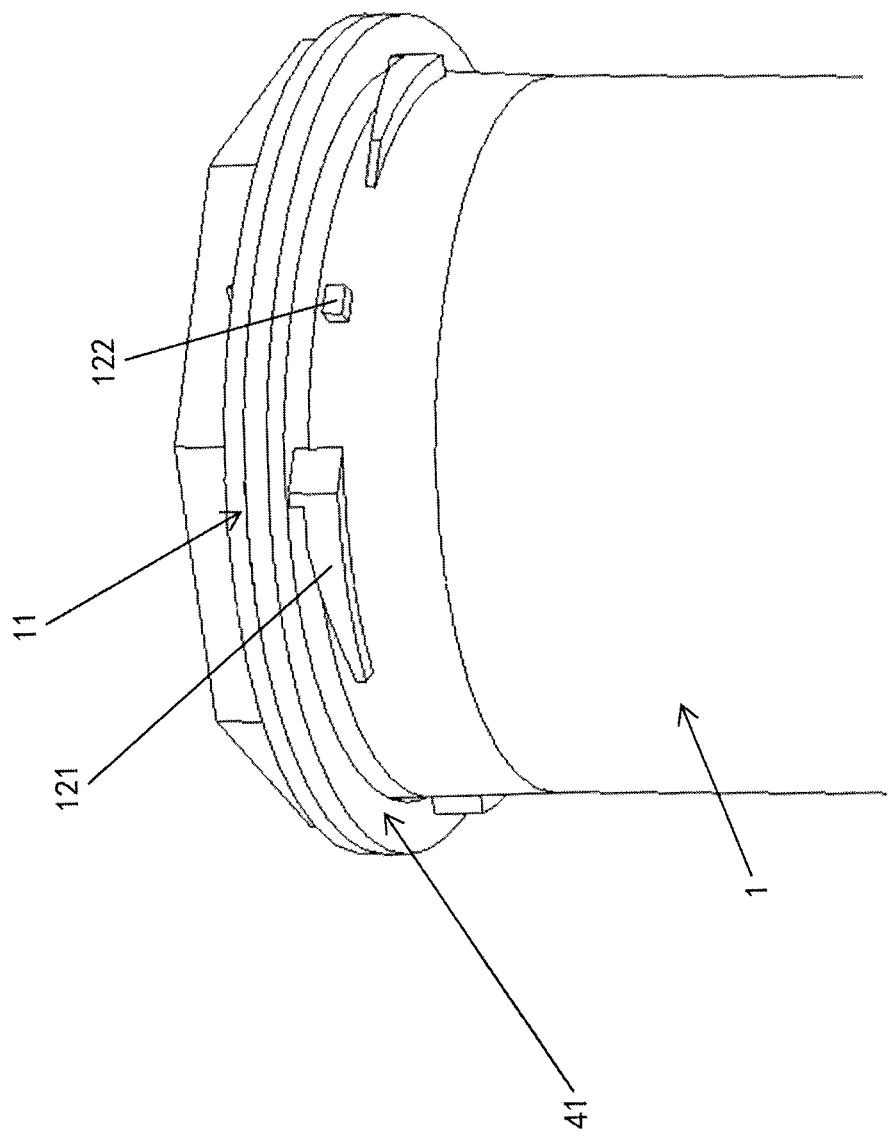
FIG. 6 shows a first embodiment of the arrangement for fastening the capacitor cap, in which a gasket, served as a seal member, is attached to a collar of the capacitor cap.
Figure 7:
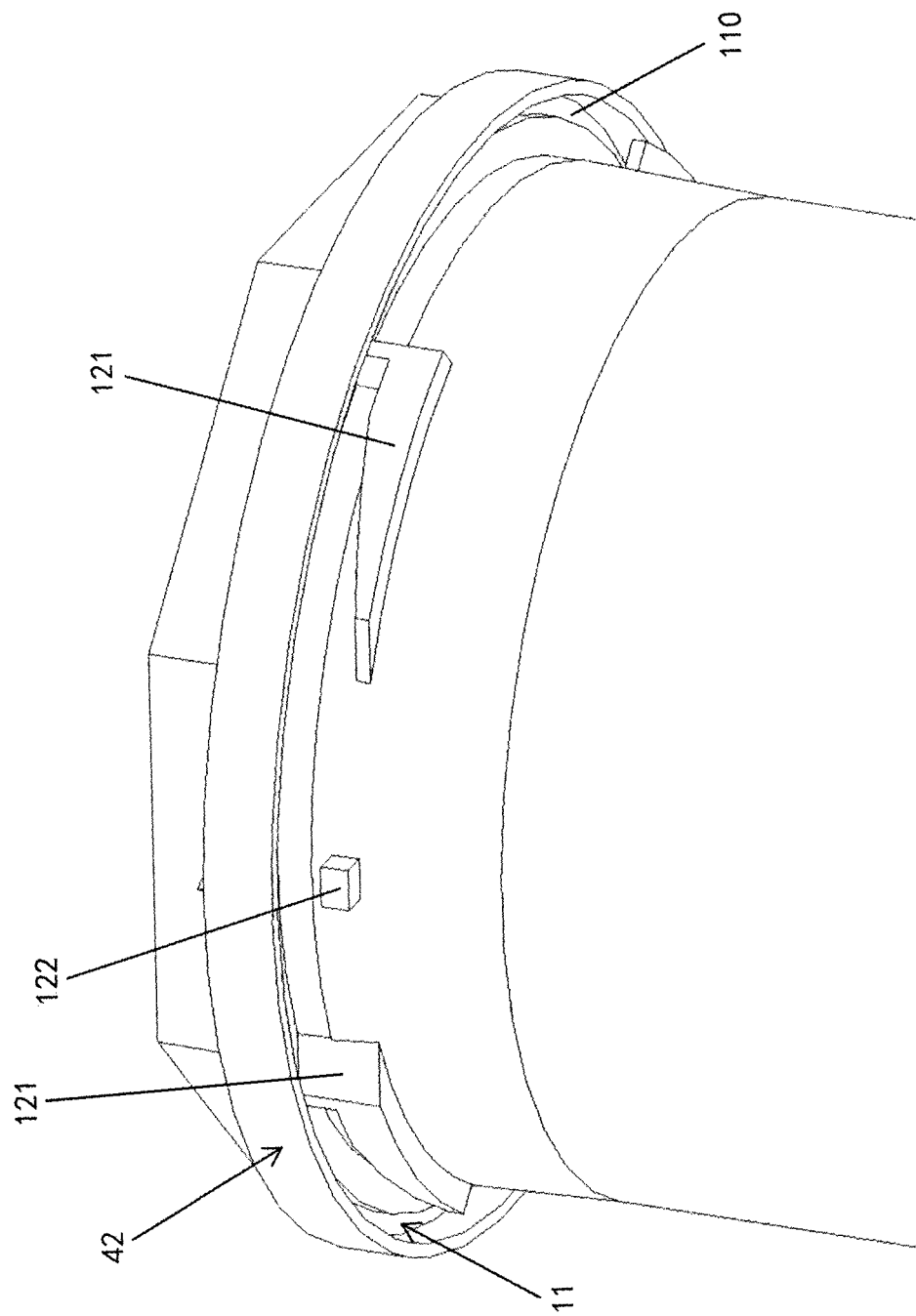
FIG. 7 shows a second embodiment of the arrangement for fastening the capacitor cap, in which a gasket, served as a seal member, is molded into a collar of the capacitor cap.
Figure 8:
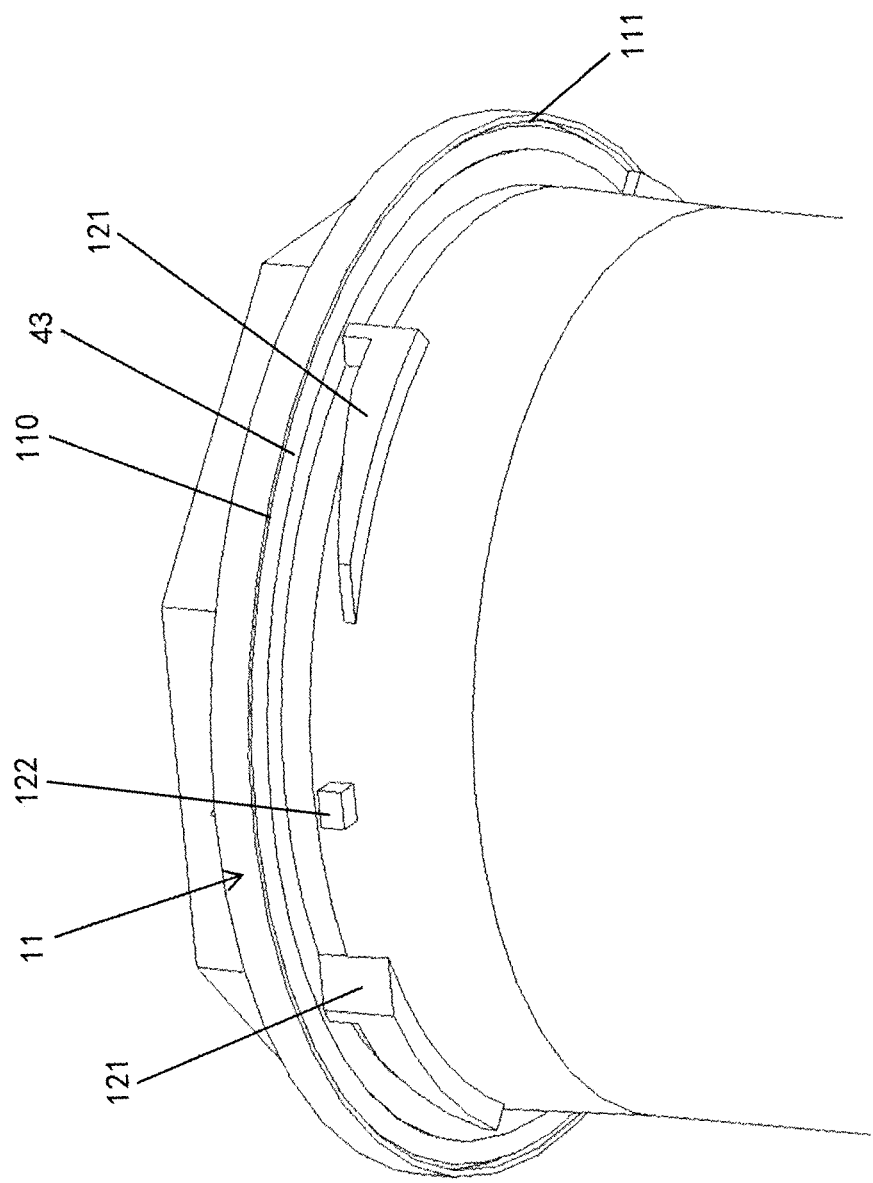
FIG. 8 shows a third embodiment of the arrangement for fastening the capacitor cap, in which an O-ring, served as a seal member, is mounted into a collar of the capacitor cap.

According to an embodiment of the present invention, the arrangement for fastening a capacitor cup 1 may further comprise a seal member 4 provided to create a seal between the capacitor cup 1 and the mid-plate 2, referring to FIGS. 6-8. Such seal member 4 may be made of a dielectric gastight and watertight material, for example, plastic material or polymer material. Moreover, the seal member 4 is elastic, so as to provide an elastic force to maintain the engagement between the first and second engagement features 12, 21 and to keep the capacitor cup 1 locked in place.

In a first embodiment of the present invention, as shown in FIG. 6, the seal member comprises a gasket 41 attached to a surface 110 of the collar 11 facing towards the opposite end of the capacitor cup 1. That is, in this embodiment, the gasket 41 is presented in a form of an independent element.

Alternatively, in a second embodiment of the present invention, as shown in FIG. 7, the seal member comprises a gasket 42 molded to a surface 110 of the collar 11 facing towards the opposite end of the capacitor cup 1. That is, in this embodiment, the gasket 42 is integrally formed with the collar 11.

In a third embodiment of the present invention, as shown in FIG. 8, the seal member comprises an O-ring 43 mounted into a groove 111 formed on a surface 110 of the collar 11 facing towards the opposite end of the capacitor cup 1.

Alternatively, in a fourth embodiment of the present invention which is not shown in figure, the seal member may comprise a gasket attached to the edge 200 of the opening 20 of the mid-plate 2.

With provision of this seal member in the arrangement for fastening the capacitor cup 1, an environmental seal between the electronics area and the environment is created and maintained.

Concerning the above, in this arrangement for fastening the capacitor cup according to the present invention, an engagement between the first engagement feature directly formed on the capacitor cup and the second engagement feature directly formed at the mid-plate is used. With the adoption of such engagement, the capacitor cup is fastened onto the opening of the mid-plate, without involving any additional fastening members or parts. Moreover, in this arrangement for fastening the capacitor cup according to the present invention, a seal member is provided to create an environmental seal between the electronics area and the environment.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An arrangement for fastening a capacitor cup within which a capacitor is accommodated, onto an opening of a mid-plate, wherein the capacitor cup comprises a cylindrical body having an opening end and an opposite end; the arrangement comprising:
   a collar provided on an outer surface of the cylindrical body, closely around the opening end;
   at least one first engagement feature formed at the outer surface of the cylindrical body and adjacent to the collar; and
   at least one second engagement feature, corresponding to the first engagement feature, formed at an edge of the opening of the mid-plate;
   wherein, an engagement between the first and second engagement features fastens the capacitor cup onto the opening of the mid-plate; and
   wherein the engagement between the first and second engagement is achieved when the capacitor cup is rotated relative to the mid-plate.

2. The arrangement for fastening a capacitor cup according to claim 1, wherein the first engagement feature comprises a projection protruded from the outer surface of the cylindrical body, and the second engagement feature comprises a slot recessed at the edge of the opening of the mid-plate, wherein, the capacitor cup is fastened onto the opening of the mid-plate when the projection passes through the slot and gets into an engagement with the edge of the opening of the mid-plate.

3. The arrangement for fastening a capacitor cup according to claim 2, wherein the projection has a wedge-shaped surface facing the collar, and a stop extended from an end of the wedge-shaped surface.

4. The arrangement for fastening a capacitor cup according to claim 3 wherein the first engagement feature further comprises a boss protruded from the outer surface of the cylindrical body, and the second engagement feature comprises a recess recessed at an edge of the opening of the mid-plate, wherein, the capacitor cup is fastened onto the opening of the mid-plate when the boss passes through the recess and gets into an engagement with the edge of the opening of the mid-plate.

5. The arrangement for fastening a capacitor cup according to claim 2, wherein the first engagement feature further comprises a boss protruded from the outer surface of the cylindrical body, and the second engagement feature comprises a recess recessed at an edge of the opening of the mid-plate, wherein, the capacitor cup is fastened onto the opening of the mid-plate when the boss passes through the recess and gets into an engagement with the edge of the opening of the mid-plate.

6. The arrangement for fastening a capacitor cup according to claim 5, wherein the first engagement feature comprises a plurality of the projections and the boss, and correspondingly, the second engagement feature comprises a plurality of the slots and the recess.

7. The arrangement for fastening a capacitor cup according claim 1, further comprising a seal member provided to create a seal between the capacitor cup and the mid-plate.

8. The arrangement for fastening a capacitor cup according to claim 7, wherein the seal member comprises a gasket attached to a surface of the collar facing towards the opposite end of the capacitor cup.

9. The arrangement for fastening a capacitor cup according to claim 7, wherein the seal member comprises a gasket molded to a surface of the collar facing towards the opposite end of the capacitor cup.

10. The arrangement for fastening a capacitor cup according to claim 7, wherein the seal member comprises an O-ring mounted into a groove formed on a surface of the collar facing towards the opposite end of the capacitor cup.

11. The arrangement for fastening a capacitor cup according to claim 7, wherein the seal member comprises a gasket attached to the edge of the opening of the mid-plate.

12. The arrangement for fastening a capacitor cup according to claim 7, wherein the seal member is elastic, so as to provide an elastic force to maintain the engagement between the first and second engagement features.

13. A capacitor cup for accommodating a capacitor therein, the capacitor cup comprising:
a cylindrical body having an opening end and an opposite end;
a collar provided on an outer surface of the cylindrical body, closely around the opening end; and
at least one first engagement feature formed at the outer surface of the cylindrical body and adjacent to the collar, for implementing an engagement with at least one corresponding second engagement feature formed on a mid-plate to which the capacitor cup is to be fastened;
wherein, the engagement between the first and second engagement features fastens the capacitor cup to the mid-plate; and
wherein the engagement between the first and second engagement is achieved when the capacitor cup is rotated relative to the mid-plate.

14. The capacitor cup according to claim 13, wherein the first engagement feature comprises a projection protruded from the outer surface of the cylindrical body, for passing through a slot formed on the mid-plate; wherein the projection has a wedge-shaped surface facing the collar, and a stop extended from an end of the wedge-shaped surface.

15. The capacitor cup according to claim 14, wherein the first engagement feature further comprises a boss protruded from the outer surface of the cylindrical body, for passing through a recess formed on the mid-plate.

16. The capacitor cup according to claim 13, further comprising a seal member provided to create a seal between the capacitor cup and the mid-plate, wherein the seal member is elastic, so as to provide an elastic force to maintain the engagement between the first and second engagement features.

17. The capacitor cup according to claim 16, wherein the seal member comprises a gasket attached to a surface of the collar facing towards the opposite end of the capacitor cup.

18. The capacitor cup according to claim 16, wherein the seal member comprises a gasket molded to a surface of the collar facing towards the opposite end of the capacitor cup.

19. The capacitor cup according to claim 16, wherein the seal member comprises an O-ring mounted into a groove formed on a surface of the collar facing towards the opposite end of the capacitor cup.

* * * * *